United States Patent
Duewer

(10) Patent No.: US 6,750,693 B1
(45) Date of Patent: Jun. 15, 2004

(54) CLOCK GENERATION CIRCUITS AND METHODS WITH MINIMAL GLITCH GENERATION AND SYSTEMS USING THE SAME

(75) Inventor: Bruce Eliot Duewer, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 0 days.

(21) Appl. No.: 10/407,672

(22) Filed: Apr. 4, 2003

(51) Int. Cl.$^7$ .............................. G06F 1/04; H03K 3/00

(52) U.S. Cl. ...................................................... 327/298

(58) Field of Search ................................ 327/160, 170, 327/172, 176, 291, 292, 294, 298, 299, 339

(56) References Cited

U.S. PATENT DOCUMENTS

| | | | | |
|---|---|---|---|---|
| 5,790,891 A | * | 8/1998 | Solt et al. ...................... | 710/34 |
| 5,818,886 A | * | 10/1998 | Castle .......................... | 375/354 |
| 6,175,603 B1 | * | 1/2001 | Chapman et al. ............ | 375/354 |
| 6,326,823 B1 | * | 12/2001 | Okui ............................ | 327/160 |
| 6,535,048 B1 | * | 3/2003 | Klindworth .................. | 327/407 |

* cited by examiner

Primary Examiner—My-Trang Nuton
(74) Attorney, Agent, or Firm—James J. Murphy; Winstead Sechrest & Minick P.C.

(57) ABSTRACT

A clock generator circuit includes a counter which counts edges of a received clock signal and a comparator which compares divide ratio control data with a count generated by the counter and generates an active state of a control signal in response. An output flip-flop toggles in response to the control signal and a selected edge of the received dock signal to toggle a state of an output clock signal.

20 Claims, 7 Drawing Sheets

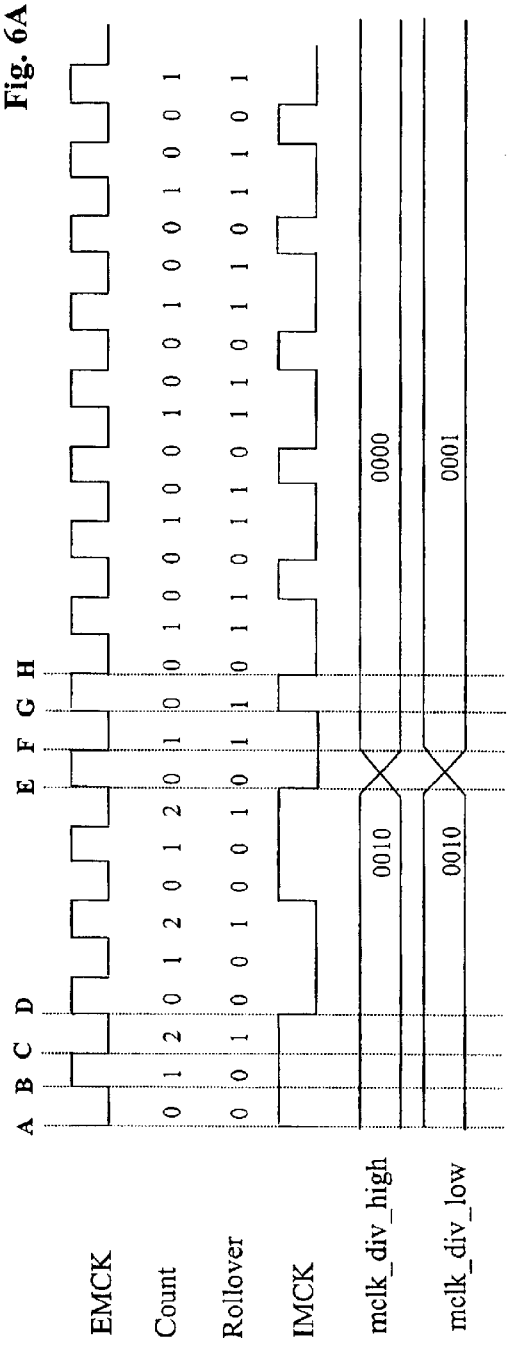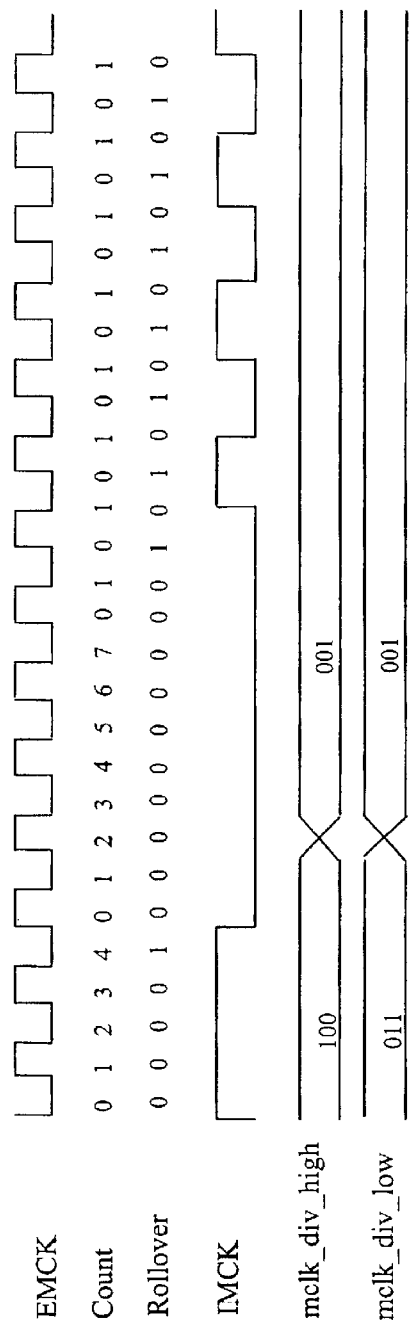

US 6,750,693 B1

CLOCK GENERATION CIRCUITS AND METHODS WITH MINIMAL GLITCH GENERATION AND SYSTEMS USING THE SAME

FIELD OF INVENTION

The present invention relates in general to integrated circuits and in particular to clock generation circuits and methods with minimal glitch generation and systems using the same.

BACKGROUND OF INVENTION

Integrated circuit devices are often provided with the capability of operating in response to external master clocks of different frequencies to allow compatibility with a range of system applications. Generally, the given device receives an external master clock of a selected frequency, which is then internally divided down by various ratios to generate a set of internal clocks of different frequencies. One or more of these internal clocks is selected, by a multiplexer or similar circuit, as required for the operation of the corresponding internal circuit blocks.

Audio devices, such as the digital to analog converters (DACs) utilized in digital audio playback systems, typically receive three clocks along with the incoming audio data stream. In particular, the external master clock (MCLK) signal controls the overall timing of the processing operations, the serial or bit clock (SCLK) signal clocks in the individual bits of serial audio data, and the left-right clock (LRCK) signal differentiates between left and right stereo data samples in the incoming data stream. In order to provide compatibility with different external systems, an internal MCLK signal is generated from the external MCLK signal, subject to a number of constraints. Specifically, the internal MCLK signal must have a frequency of at least twice the SCLK signal frequency. At the same time, the frequency of the internal MCLK signal must have a certain oversampling ratio with respect to the frequency of the LRCK signal, often 256×, 128×or 64×. Furthermore, the internal MCLK signal must have an absolute frequency range as dictated by the operating characteristics of the device-internal circuitry.

Typically, the received external MCLK signal is divided by a selected set of divide ratios to generate a set of available internal MCLK signals of corresponding frequencies. Internal circuitry, such as a state machine, then transitions through the available internal MCLK signals until an internal MCLK signal is found which meets the above criteria. This internal MCLK signal is then selected to control the overall timing internal to the device. This process however is subject to significant disadvantages. For example, since a number of possible internal MCLK clock signals are generated, in addition to the actual internal MCLK signal which is required, a substantial amount of unnecessary noise is added to the system. Additionally, the multiplexers normally required to perform the clock selection often introduce transition glitches and "unsafe" clock signals during the process of testing the available internal MCLK signals to detect the MCLK signal of the proper frequency. (A "safe" transition between clocks occurs when the logic low period of the selected clock output from the corresponding selection circuitry is not shorter than the shortest logic low period of any of the clocks input to the selection circuitry. Similarly, a safe transition occurs when the logic high period of the selected clock output from the selection circuitry is not shorter than the shortest logic high period of any of the clocks input into the selection circuitry.) Finally, these conventional schemes are difficult to scale and often require the expenditure of significant redesign efforts when a circuit designer attempts to translate a given clock generation design from one chip to another chip.

Hence, new techniques are required for generating internal clock signals, such as the internal MCLK signals used in audio applications. Such techniques should minimize glitches and unsafe clock operating regions during the clock signal generation process, especially during multiplexer switching.

SUMMARY OF INVENTION

A clock generator circuit includes a counter which counts edges of a received clock signal and a comparator which compares divide ratio control data with a count generated by the counter and generates an active state of a control signal in response. An output flip-flop toggles in response to the control signal and a selected edge of the received clock signal to toggle a state of an output clock signal.

Clock generation circuits and methods embodying the principles of the present invention advantageously reduce system noise since only a single internal clock signal of the derived frequency is generated. Furthermore, according to these principles, the need for an output multiplexer is eliminated, thereby reducing the number of glitches caused during the process of setting the appropriate internal clock frequency. Additionally, embodiments of the present invention allow for the generation of an internal clock with a non-integer frequency ratio with respect to the external clock frequency from which the internal clock is being derived.

BRIEF DESCRIPTION OF DRAWINGS

For a more complete understanding of the present invention, and the advantages thereof, reference is now made to the following descriptions taken in conjunction with the accompanying drawings, in which:

FIGS. 6A and 6B are timing diagrams illustrating exemplary operations of a digital clock generator shown in FIG. 3.

DETAILED DESCRIPTION OF THE INVENTION

The principles of the present invention and their advantages are best understood by referring to the illustrated embodiment depicted in FIGS. 1–6 of the drawings, in which like numbers designate like parts.

Figure 1:
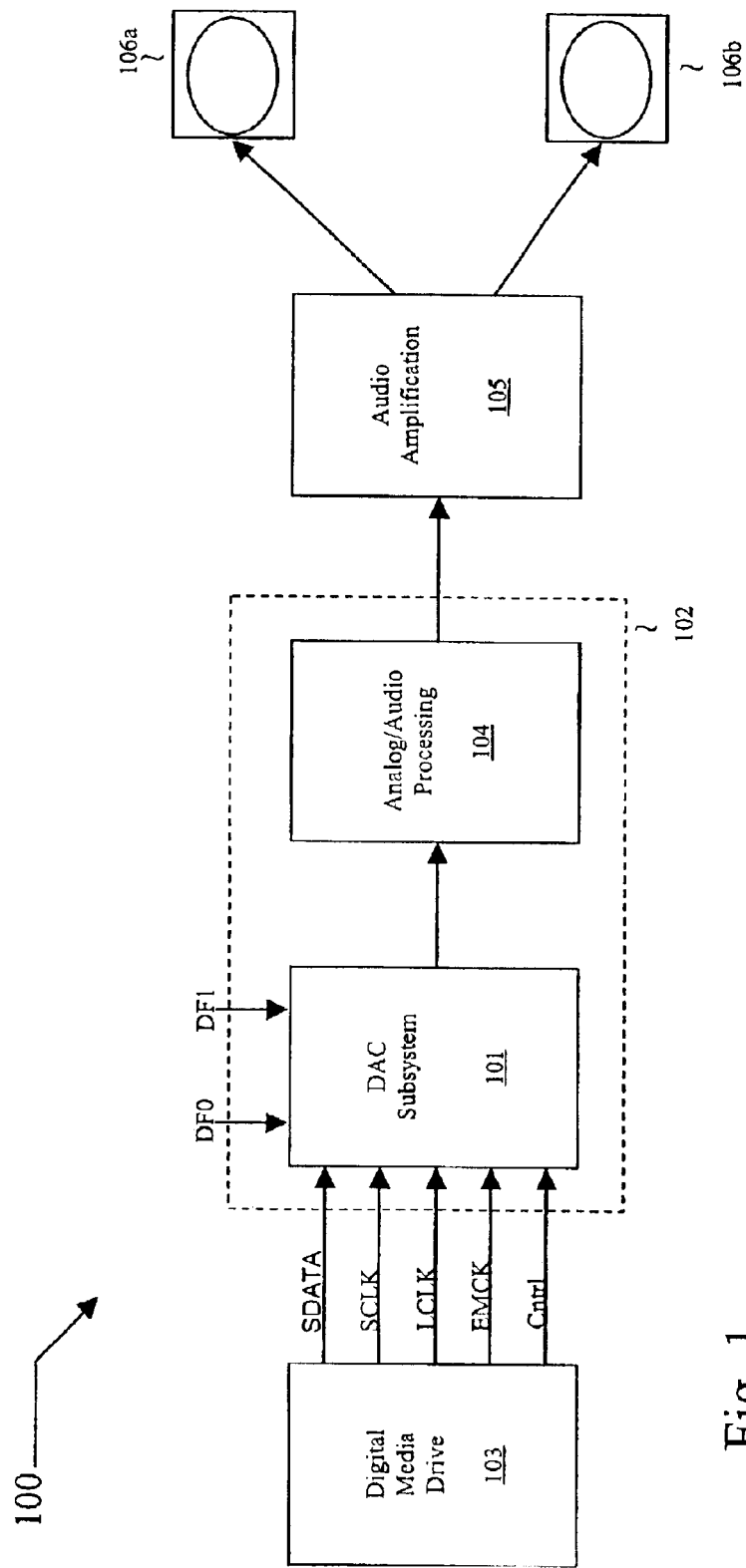
FIG. 1 is a diagram of a representative audio system application of one-bit digital-to-analog converter subsystem (DAC) according to the principles of the present invention.

FIG. 1 is a diagram of a typical audio system 100 of one-bit digital-to-analog converter subsystem (DAC) 101 according to the principles of the present invention. In this example, DAC subsystem 101 forms part of an audio component 102, such as a compact disk (CD) player, digital audio tape (DAT) player or digital versatile disk (DVD) unit. A digital media drive 103 recovers the digital data, for example one-bit audio data in the Sony/Philips Super Audio Compact Disk (SACD) format from the given digital data storage media, and passes those data, along with clocks and control signals, to DAC subsystem 101. The resulting analog (audio) data undergoes further processing in analog/audio processing circuit block 104 prior to amplification in audio amplifier block 105. Amplifier block 105 then drives a set of conventional speakers 106a and 106b.

Multi-bit digital audio data is received by DAC subsystem 100 serially through the SDATA pin timed by the serial clock (SCLK) signal. The left and right channel data are alternately processed in response to the left-right clock (LRCK) signal, which is normally at the sampling rate. In system 100, the external master clock (EMCK) signal is received by DAC subsystem 101 from digital media drive 103.

Figure 2:
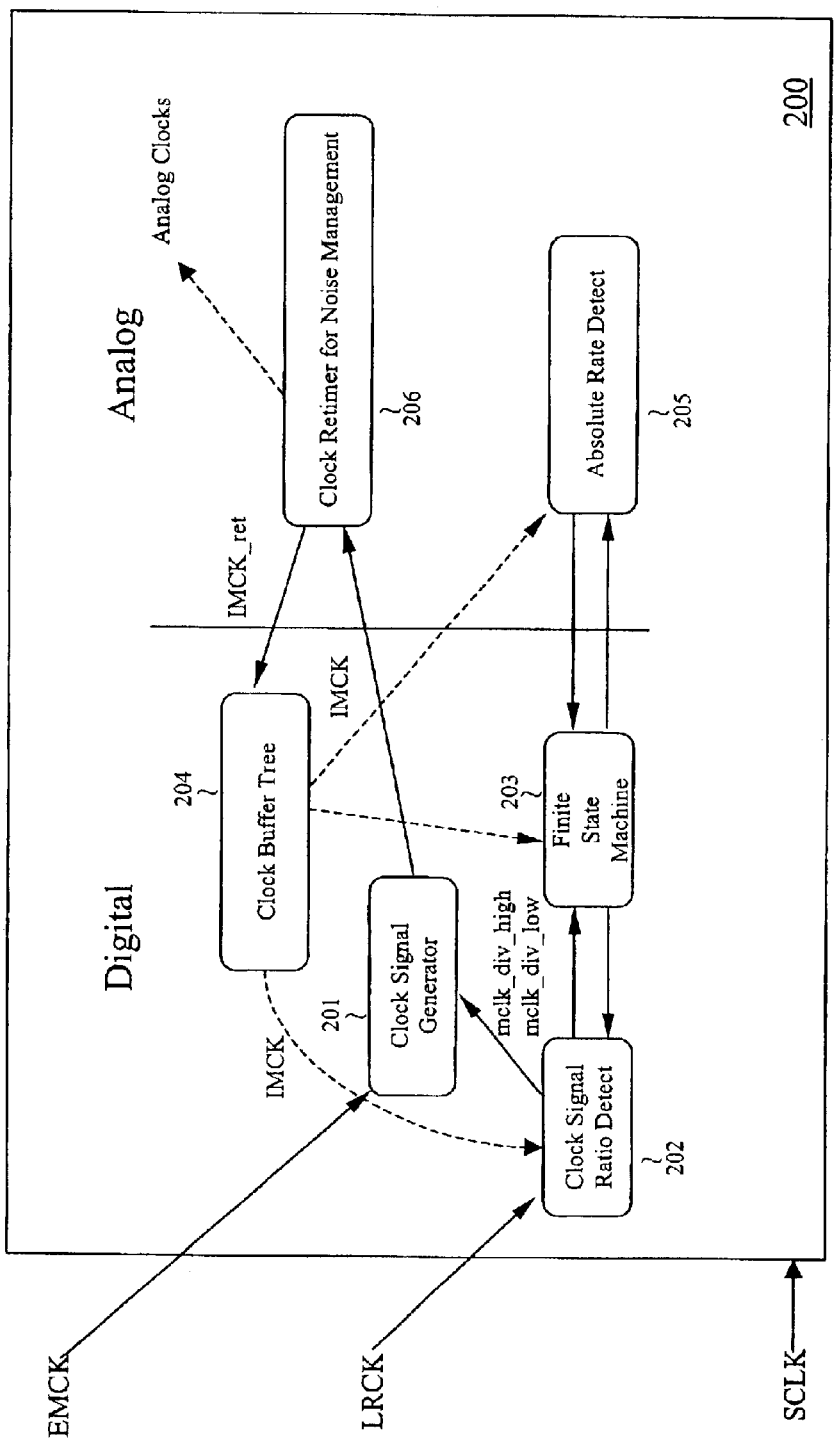
FIG. 2 is a block diagram of clock generation circuitry suitable for use in applications such as the DAC subsystem shown in FIG. 1.

FIG. 2 is a block diagram of representative clock generation circuitry 200 suitable for use in applications such as DAC subsystem 100 shown in FIG. 1. Clock generation circuitry 200 includes a clock signal generator 201 which receives an external clock signal, such as the external master clock (EMCK) signal shown in FIG. 1, and generates one or more internal clock signals, such as an internal master clock (IMCK) signal. Clock generator 201 will be discussed in detail below; however, generally clock generator 201 generates the IMCK signal with predetermined relationship with the EMCK under the control of control data MCLK_DIV_LOW and MCLK_DIV_HIGH.

Control data MCLK_DIV_LOW and MCLK_DIV_HIGH are generated by clock signal ratio detector 202 under the control of finite state machine 203. Generally, while clock generation circuitry 200 cycles through the possible values of the IMCK signal, clock ratio detector 202 compares the externally generated LRCK signal, at the input sample rate, against the current IMCK provided by clock buffer tree 204 and generates the data MCLK_DIV_LOW and MCLK_DIV_HIGH until the desired IMCK to LRCK ratio is obtained.

Absolute rate detector 205 monitors the absolute frequency of the IMCK signal and allows finite state machine 203 to maintain the absolute frequency of the IMCK within predetermined limits while the IMCK signal is varied to achieve the proper IMCK clock signal to LRCK signal ratio. A clock retimes 206 retimes the IMCK signal as required for internal noise management.

Figure 3:
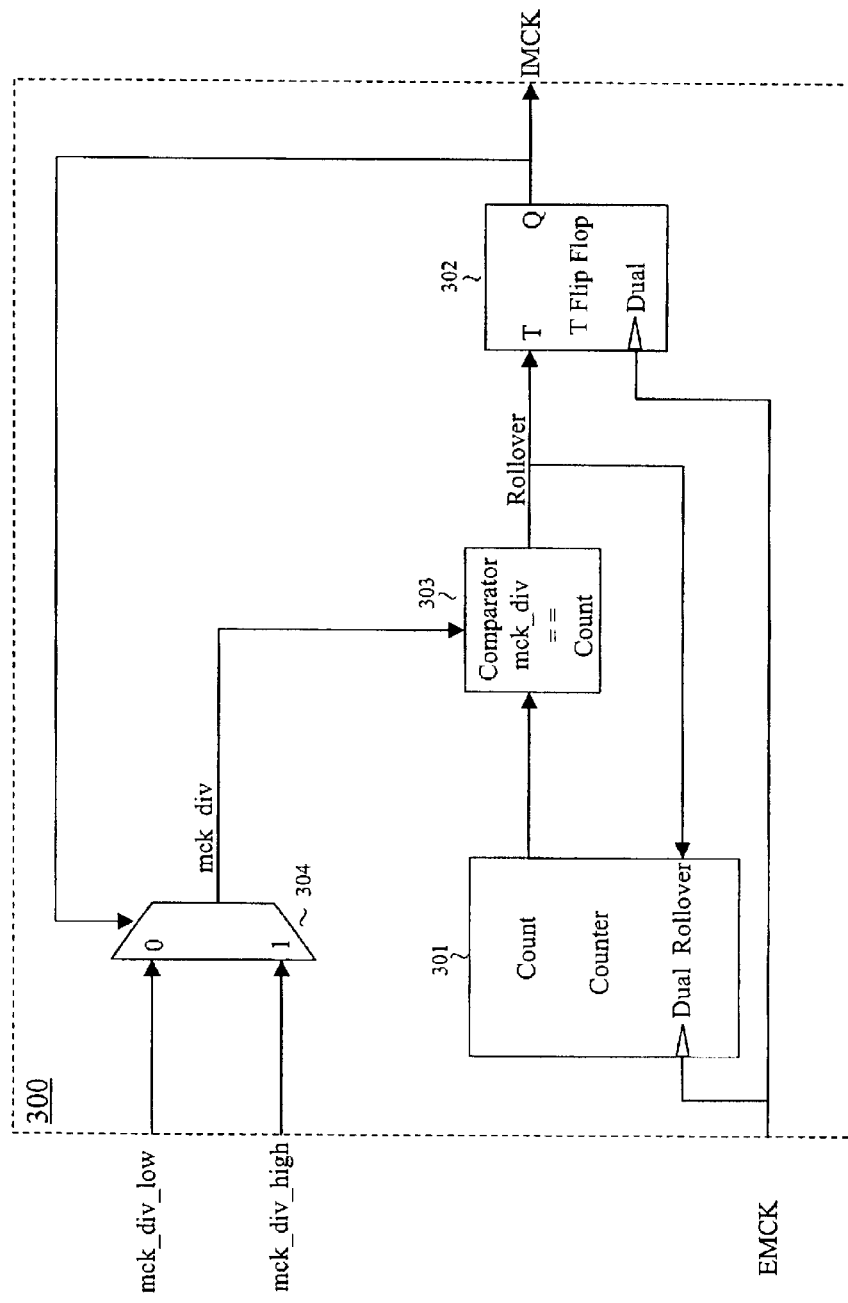
FIG. 3 is a block diagram of a digital clock generator according to one embodiment of the principles of the present invention and suitable for utilization in the clock generator block shown in FIG. 2.

FIG. 3 Is a block diagram of an exemplary digital clock signal generator 300 according to one embodiment of the principles of the present invention and suitable for utilization in clock signal generation block 201 of FIG. 2. Clock signal generator 300 includes a dual-edge triggered counter 301 which increments in response to both the rising and falling edges of the EMCK signal. The EMCK signal also drives the clock input of a dual-edge triggered toggle flip-flop 302, which outputs the IMCK signal of a given frequency, as discussed further below. One particular advantage of utilizing dual-edge triggered counter 301 is the capability to count half-periods of the EMCK signal which in turn allows for the Implementation of half-valued divide ratios. Exemplary embodiments of dual-edge triggered counter 301 and dual-edge toggle flip-flop 302 are also discussed below in conjunction with FIGS. 4A and 4B, and 5, respectively.

The count output signal (COUNT) from a counter 301 drives one input to comparator circuitry 303 which generates the control signal ROLLOVER. Specifically, an active logic high state of the ROLLOVER signal is generated whenever the COUNT output is equal to the value of MCK_div. The active state of the ROLLOVER signal feeds-back to the rollover input to counter 301. In particular, when the ROLLOVER signal transitions to an active logic high state, the output signal COUNT from counter 301 rolls over (resets) to zero (0) on the next rising or falling edge of the EMCK signal.

The ROLLOVER signal is also presented to the toggle (T) input to dual-edge triggered toggle flip-flop 302 and toggles the Q output of flip-flop 302, which is the IMCK signal, to the rising and falling edges of the EMCK signal. The IMCK signal is also fed back to the control terminal of multiplexer 304, which selects the value of the MCK_div data being provided to comparator circuitry 303 from clock ratio detect block 202 of FIG. 2. Specifically, when the IMCK signal is a logic low state, multiplexer 304 selects the MCK_div_low data output from clock ratio detect circuitry 202. On the other hand, when IMCK is in a logic high state, multiplexer 304 selects the MCK_div_high data from clock ratio detect block 202 to be the MCK_div data being passed to comparator circuitry 303.

Figure 4A:
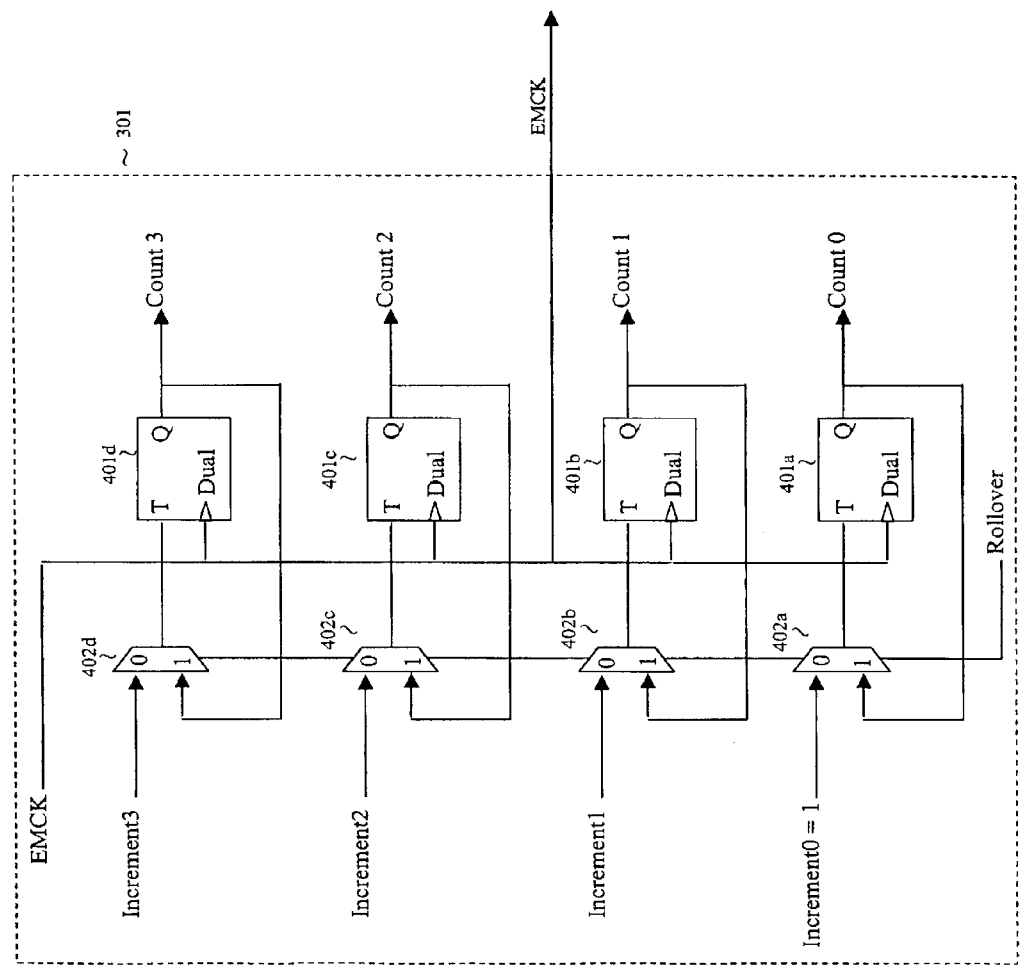
FIGS. 4A and 4B are more detailed block diagrams of a dual-edged triggered counter suitable for use in the clock generator block shown in FIG. 3.
Figure 4B:
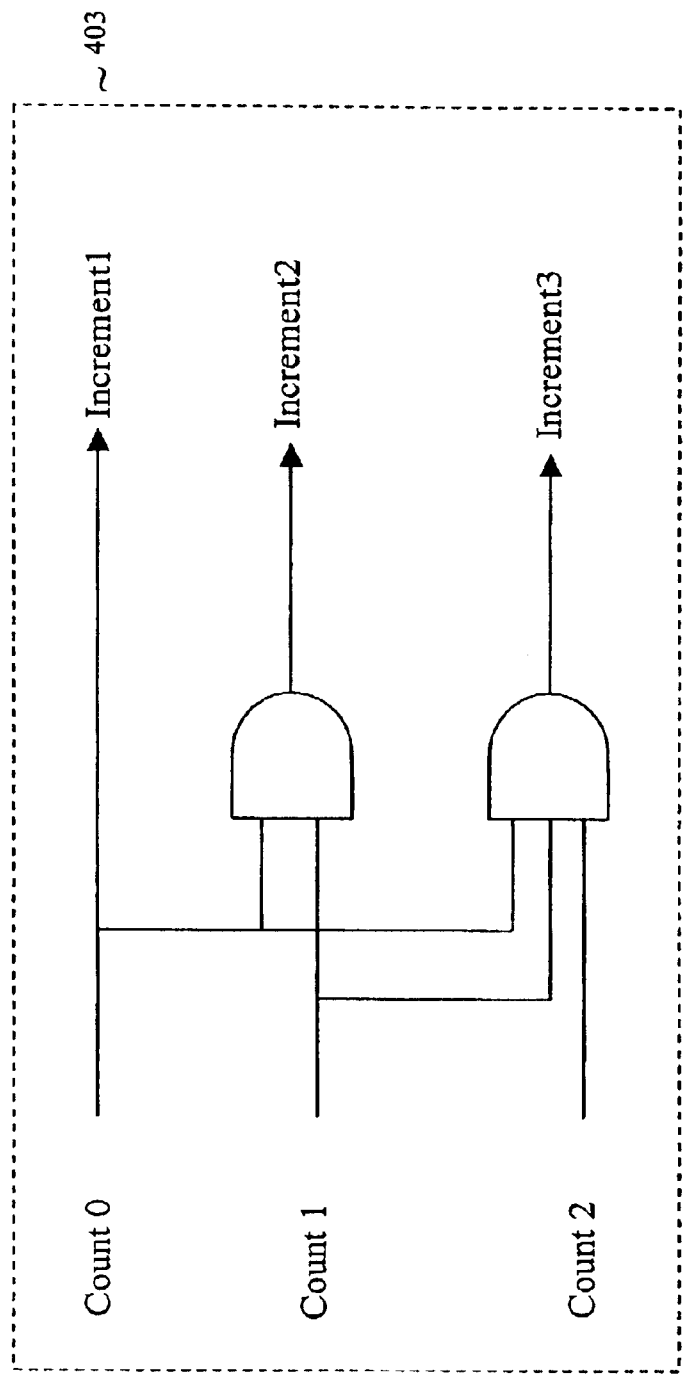

FIGS. 4A and 4B are more detailed block diagrams of dual-edged triggered counter 301. In FIG. 4A, a set of a dual-edge triggered toggle flip-flops 401a–401d and corresponding multiplexers 402a–402d are configured as a four-bit binary counter. In alternate embodiments, counter 301 could be configured as a Gray counter. Advantageously, the configuration of counter 301 shown in FIG. 4A is easily scaleable to support the counting of fewer or more than four (4) bits, as required to change the number of divide ratios available in digital clock signal generator 300.

The control ROLLOVER signal controls the selection by multiplexers 402a–402d between the output of the corresponding counter toggle flip flop 401a–401d and a corresponding INCREMENT0-INCREMENT3 signal. For example, for bit 0, multiplexer 402a selects between the corresponding output COUNT0 fed-back from a flip-flop 401a and the signal INCREMENT0. The outputs dual-edged triggered toggle flip-flops 401a–401d toggle in response to both the rising and falling edges of the EMCK signal.

The signal INCREMENT0 in the embodiment of FIG. 4A is fixed to a logic high state. The signals INCREMENT1, INCREMENT2 and INCREMENT3 are generated as shown in the logic diagram 403 of FIG. 4B. In particular, signal INCREMENT1 is equal to the value of COUNT0 output from flip-flop 401a of FIG. 4A. The value of INCREMENT2 transitions to a logic high state when the signals COUNT0, and COUNT1, output from flip-flop 401b, are both in a logic high state. Similarly, the signal INCREMENT3 is in a logic high state when the signals COUNT0, COUNT1, and COUNT2, output from flip-flop 401c of FIG. 4A, are all in logic high state.

Figure 5:
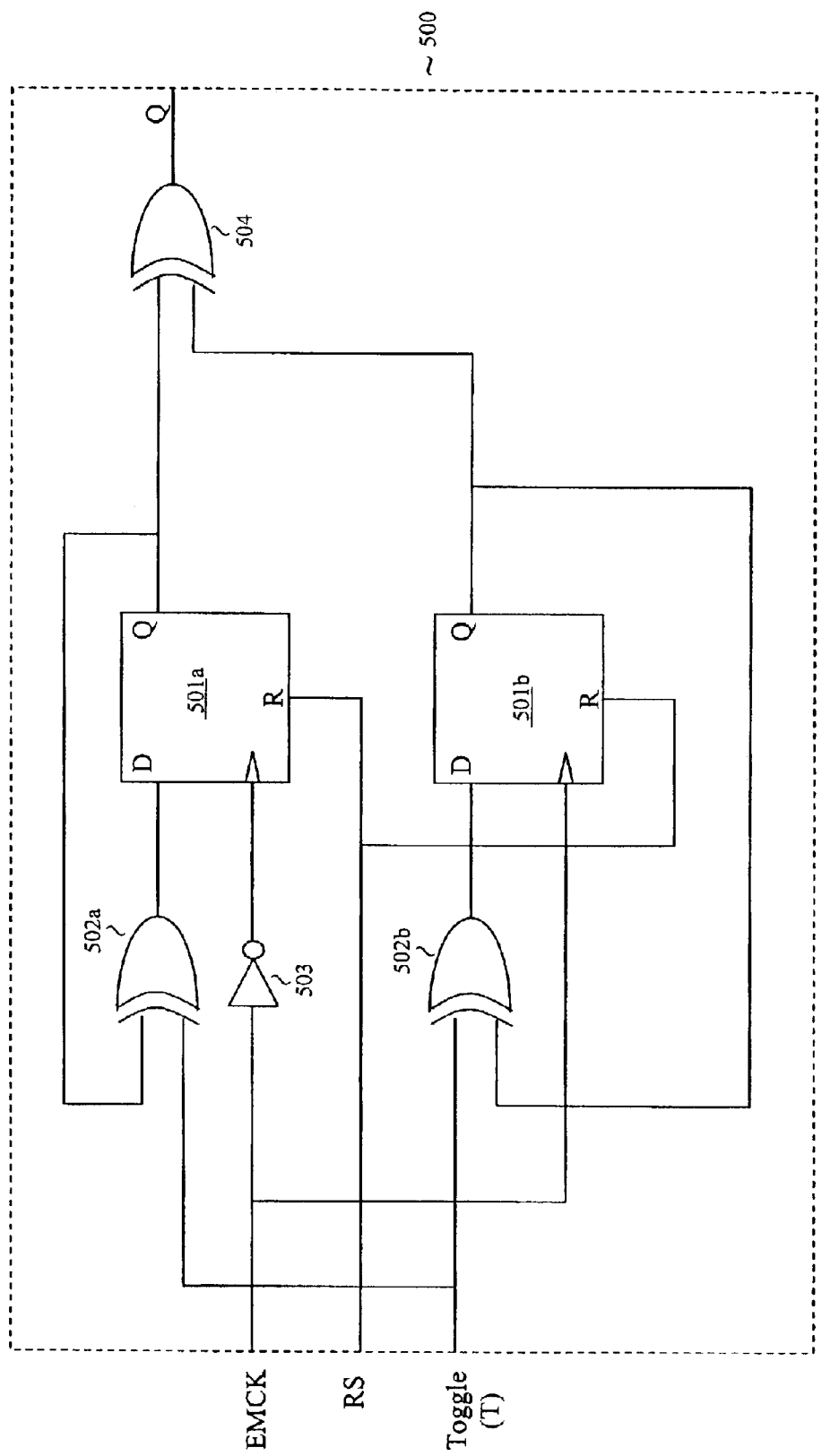
FIG. 5 illustrates one particular embodiment of a dual-edge triggered flip-flop suitable for use as the output flip-flop shown in FIG. 3 and as the counter flip-flops shown in FIG. 4A.

FIG. 5 illustrates one particular embodiment of a dual-edge triggered flip-flop 500 suitable for use as output toggle flip-flop 302 of FIG. 3 and counter toggle flip-flops 401a–401d of FIG. 4A. Dual-edged flip-flop 500 includes a pair of conventional edge triggered toggle D flip-flops 501a and 501b and a corresponding pair of input exclusive-OR gates 502a and 502b. To achieve dual-edge triggering, flip-flop 501a transitions on the falling edges of the EMCK signal, after passing through inverter 503, and flip-flop 501b transitions on the rising edges of the EMCK signal. The output of dual-edge triggered flip-flop 500 is generated from the Q outputs of flip-flops 501a and 501b by exclusive-OR gate 504.

FIGS. 6A and 6B are a timing diagram illustrating exemplary operations of digital clock generator 300 shown in FIG. 3. Specifically, FIG. 6A illustrates the case in which clock generator 300 is initially dividing the EMCK signal clock by three (3) and then changes to a divide by one and a half (1.5) operation. FIG. 6B illustrates an example where digital clock generator 300 is initially dividing the EMCK signal by four and a half (4.5) and then changes to perform a divide by two (2) operation. Advantageously, as shown in FIGS. 6A and 6B, the changes in divide ratios minimize glitches and unsafe periods in the internal clock signal IMCK.

In FIG. 6A, the exemplary divide by three (3) operation begins at EMCK signal edge A with the IMCK signal in a logic high (1) state, and the signals ROLLOVER and COUNT both in a logic low (0) state. Both the MCLK_DIV_HIGH and MCLK_DIV_LOW dates are set to a binary 0010 (i.e. decimal two). In this state, multiplexer 304 passes the MCLK_DIV_high data as the MCK_DIV data 9 into comparator 303. In the illustrated embodiment, the logic high (1) periods of the IMCK signal have a length of MCLK_DIV_high +1 number of half-periods of the EMCK signal and the logic low (0) periods of the IMCK signal have a length of MCLK_DIV_LOW+1 number half-periods of the EMCK signal.

Counter 301 of FIG. 3 then increments on the next two edges of the EMCK signal, respectively labeled B and C in FIG. 6A. At EMCK edge C, COUNT is now at a decimal two (2) and therefore equals the MCLK_DIV_HIGH date such that the ROLLOVER signal transitions to a logic high (1) state. Consequently, on the next edge of the EMCK signal, labeled D in FIG. 6A, the COUNT signal rolls over to a logic low (0) state and the active logic high (1) state of the ROLLOVER signal toggles the IMCK signal output from toggle flip-flop 302 to a logic low (0) state.

The process illustrated by EMCK clock cycles A–D repeats itself to generate a IMCK signal with a divide ratio of three (3) with respect to the EMCK signal, as long as the MCLK_DIV_HIGH and MCLK_DIV_LOW both are set to binary 0010 (decimal 2).

In the example shown in FIG. 6A, a change in the divide ratio is made at the EMCK clock edge labeled E. Specifically, the divide ratio is changed to 1.5 by resetting the MCLK_DIV_HIGH data to a binary 0000 (decimal 0) and the MCLK_DIV_LOW data to a binary 0001 (decimal 1). The IMCK signal is generated by dividing the EMCK signal by 1.5 as follows.

At EMCK edge E, the IMCK, ROLLOVER, and COUNT signals are all in a logic low (0) state. At the EMCK signal edge F, counter 301 increments COUNT to a decimal one (1). With IMCK at a logic low, comparator 303 compares COUNT with the MCLK_DIV_LOW data, which is now also set to one (0001). Consequently, since the COUNT signal equals the MCLK_DIV_LOW data, at the EMCK edge labeled F, the ROLLOVER signal transitions to a logic high (1) state. Thereafter, on the next edge of the EMCK signal, in this example the edge labeled G, the IMCK signal toggles to a logic high (1) state.

With the IMCK signal now in a logic high (1), multiplexer 304 of FIG. 3 passes the MCLK_DIV_HIGH data for comparison against the COUNT signal in comparator 303. In this case, since the MCLK_DIV_HIGH data are set to a logic 0 (0000), the ROLLOVER signal remains in a logic high (1) state. Therefore, at the next EMCK signal edge, in this case the edge labeled H in FIG. 6A, the COUNT signal rolls over to a logic low (0) state. Additionally, the logic high (1) state forces the IMCK signal to toggle to a logic low (0) state at EMCK signal edge H.

The divide by 1.5 process then repeats itself starting with edge H of the EMCK signal and continues as long as the MCLK_DIV_HIGH data are set to binary 0000 (decimal 0) and the MCLK_DIV_low data are set to a binary 0001 (decimal 1).

FIG. 6B illustrates a second example in which the divide ratio changes on-the-fly. In this case, the MCLK_DIV_HIGH data are initially set to a binary 0100 (decimal 4) and the MCLK_DIV_LOW data are initially set to a binary 0011 (decimal 3). Therefore, the EMCK signal is initially divided by four and a half (4.5) -to generate the IMCK signal. The values of the MCLK_DIV_HIGH and MCLK_DIV_LOW data are subsequently both changed to a binary 001 (decimal 1) to implement a divide by 2 ratio between the EMCK and IMCK signals.

In sum, the principles of the present invention ensure that the logic low periods the IMCK signal are not shorter than the shortest logic low period of the EMCK signal (i.e. the transitions of the IMCK signal are safe). Similarly, safe transitions of the IMCK signal are ensured by ensuring that the shortest logic high period of the IMCK signal is not shorter than the shortest logic high period of the EMCK signal. In other words, switching between any two frequencies of the IMCK signal occurs no faster than the higher of those two IMCK signal frequencies.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A clock generator circuit comprising:
   a counter for counting edges of a received clock signal;
   a comparator for comparing divide ratio control data with a count generated by the counter and selectively generating an active state of a control signal in response, and
   an output flip-flop toggling in response to the active state of the control signal and a selected edge of the received clock signal to toggle a state of an output clock signal.

2. The clock generator of claim 1, wherein the active state of the control signal further selectively resets the count in the counter to a selected value on a selected edge of the received clock signal.

3. The clock generator circuit of claim 1, wherein the divide ratio control data comprise first control data for selecting a length of logic high periods of the output clock signal and second control data for selecting a length of a logic low period of the output clock signal.

4. The clock generator circuit of claim 3, further comprising a selector for selecting between the first and second control data in response to a state of the output clock signal.

5. The clock generator circuit of claim 3, wherein the first control data selects a length of the logic high periods of the output clock signal as a number of half-periods of the received clock signal and the second control data selects a length of the logic low periods of the output clock signal as a number of half-periods of the received clock signal.

6. The clock generator circuit of claim 3, wherein the first control data represents a value N, N greater than or equal to zero, selecting the length logic high period of the output clock signal to be N+1 number of half-periods of the received clock signal and the second control data represents a value M, M greater than or equal to zero, selecting the length logic low period of the output clock signal to be M+1 number of half-periods of the received clock signal.

7. The clock generator circuit of claim 1, wherein the counter counts rising and failing edges of the received clock signal.

8. The clock generator circuit of claim 1, wherein the output flip-flop comprises a dual edge triggered toggle flip-flop toggling in response to an active state of the control signal and a corresponding edge of the received clock signal.

9. A method of generating a clock signal comprising:

counting edges of a received clock signal to generate a count;

comparing control data with the count and generating an active state of a control signal in response; and toggling a state of an output clock signal in response to the active state of the control signal and a selected edge of the received clock signal.

10. The method of claim 9, further comprising resetting the count to a selected value on a selected edge of the received clock signal in response to the active state of the control signal.

11. The method of claim 9, wherein counting edges of the received clock signal comprises counting rising and falling edges of the received clock signal.

12. The method of claim 9, wherein comparing the count with control data comprises selectively comparing the count with first data defining a length of a first logic state of the output clock signal and second data defining a length of a second logic state of the output clock signal.

13. The method of claim 12, further comprising selecting between the first and second data in response to a current logic state of the output clock signal.

14. The method of claim 12, wherein the first data represents the length of the first logic state of the output clock signal as a number of half-periods of the received clock signal and the second data represents the length of the second logic state of the output clocks signal as a number of half-periods of the received clock signal.

15. The method of claim 12, wherein the first data represents a value N, N greater than or equal to zero, selecting the length of the first logic state of the output clock signal to be N+1 number of half-periods of the received clock signal and the second data represents a value M, M greater than or equal to zero, selecting the length the second logic state of the output clock signal to be M+1 number of half-periods of the received dock signal.

16. A system comprising:

a signal source providing a first signal of a first frequency; and a signal generator for generating a second signal of a second frequency selected in response to received control data, the control data defining logic high and logic low periods of the second signal in numbers of half-periods of the first signal, the signal generator comprising:

a counter for counting rising and falling edges of the first signal;

a comparator for comparing the control data with a count generated by the counter and generating a control signal in response, a selected state of the control signal resetting the count to a selected value on a subsequent edge of the first signal; and an output flip-flop toggling in response to the selected state of the control signal and a selected edge of the first signal to change a current logic state of the second signal.

17. The system of claim 16 wherein the signal generator forms a portion of an integrated circuit and the signal source is disposed external to the integrated circuit.

18. The-system of claim 16 wherein the first signal comprises an external audio processing master clock and the second signal comprises an internal audio master clock.

19. The system of claim 16, wherein the first and signals comprise clock signals.

20. The system of claim 16, wherein the system comprises an audio system and the signal generator forms a portion of an audio digital to analog converter.

* * * * *

UNITED STATES PATENT AND TRADEMARK OFFICE
CERTIFICATE OF CORRECTION

PATENT NO. : 6,750,693 B1
DATED : June 15, 2004
INVENTOR(S) : Bruce Eliot Duewer It is certified that error appears in the above-identified patent and that said Letters Patent is hereby corrected as shown below:

Title page,
Item [57], ABSTRACT,
Line 6, "dock" should be -- clock --.

Column 3,
Line 49, "retimes" should be -- retimer --.
Line 63, "Implementation" should be -- implementation --.

Column 6,
Line 67, "failing" should be -- falling --.

Signed and Sealed this

Twenty-first Day of December, 2004

JON W. DUDAS
*Director of the United States Patent and Trademark Office*